Aug. 19, 1930.  J. A. LINDE  1,773,588
ORTHODONTIC APPLIANCE ADJUSTER
Filed March 31, 1928
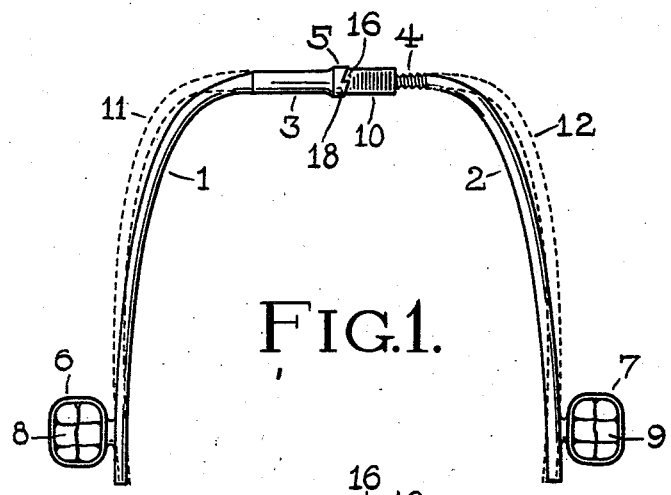
FIG. 1.
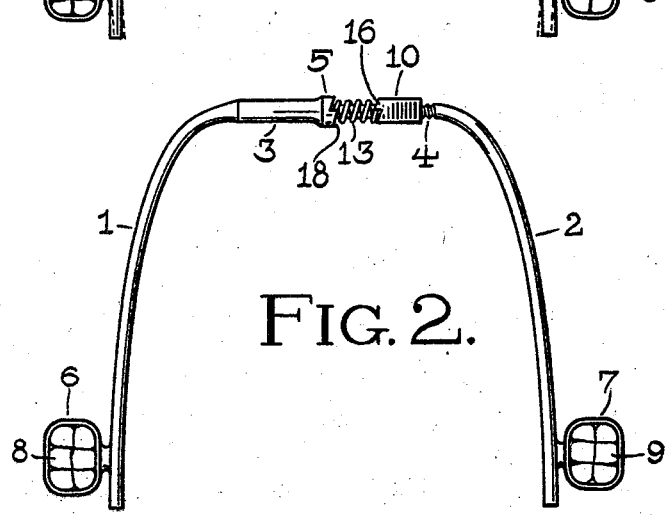
FIG. 2.
FIG. 3.
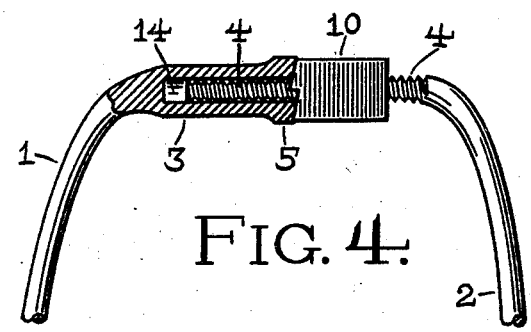
FIG. 4.
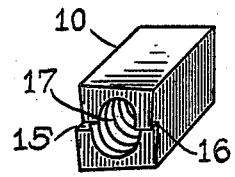
John A. Linde  INVENTOR Patented Aug. 19, 1930

1,773,588

UNITED STATES PATENT OFFICE

JOHN A. LINDE, OF NEW YORK, N. Y.

ORTHODONTIC-APPLIANCE ADJUSTER

Application filed March 31, 1928. Serial No. 266,416.

This invention relates to orthodontic appliance arches and adjusting means therefor, and particularly to that class of the same wherein adjustment may be had to increase the outward tension by means of a nut mounted on the arch.

The object of my invention is to provide an arch with a self locking nut which is very easy to rotate in the direction of increased tension of the arch but which is such construction in relation to the arch that it will resist any return and will thus retain the advantage gained.

Another object is to furnish an arch of simple construction which is easy to manufacture and inexpensive in design.

Further objects and advantages will appear as this specification proceeds.

In the acompanying drawing, Fig. 1 is a view of an orthodontic appliance arch embodying the novel features of my invention.

Fig. 2 is a similar view with an included modification.

Fig. 3 is view of the lock nut shown in the previous views to further reveal its novel form.

Fig. 4 is a partial view of the arch shown in Fig. 1 with a fragment of the same in section.

In the practice of orthodontia, the dentist often is baffled in his attempts to cause certain movements of maloccluded teeth because the arches he uses will only provide a very limited degree of tension and possible movement. This is sometimes partly overcome by using several arches in sucession, but it is an object of the herein described invention to provide ample latitude both for tension on the particular teeth indicated, besides any desired degree of possible movement of the arch and the teeth.

The arch wire 1 is provided with a sleeve extremity 3 which terminates at 5 in one or more end teeth similar to 18. The opposite half of the arch 2 is formed at its upper extremity into a relatively straight threaded portion which is adapted to slidably fit the hollow channel 14 of sleeve 3. This thread 4 of wire 2 is fitted with a square nut 10, whose one extremity has a pair of teeth 16 and 15 which are adapted to cooperate with the end teeth of the arch wire 1.

If we now more particularly note the action of the arch in use, the tooth band 6 is first secured to wire 1 and fitted to the indicated tooth 8 which is to be moved outward, while a second band 7 is secured to the other arch wire 2 and fitted to the second tooth 9, against which an outward tension is also desired. When the nut 10 is rotated on the thread of wire 1, the nut having, of course, an internal thread 17, the wire thread 4 will be drawn out partly out of channel 14 and will cause the wires 1 and 2 to assume the positions noted at 11 and 12, respectively.

However, owing to the presence of the mutually engageable teeth 15 and 16 on the nut and tooth 18 on the part 5, the nut will not be able to return to any former position of itself. In the mentioned new position, it is evident that a great tension may be had on the teeth 8 and 9, tending constantly to force them apart. It is also evident that any fine degree of tension may be had, and that at any time the tension may be increased to compensate for movement which may have taken place in the teeth, it being clear that any such gains are successively retained by the arch in every position.

The arch as described has been employed with a view to providing a rather harsh tension on indicated teeth, reliance being had on the inherent tenacity of the arch wires 1 and 2 alone. For some purposes, it is desirable to have a softer and more flexible tension without sacrificing the possible radius of movement, and a spring 13 may therefore be interposed between the nut 10 and sleeve end 5. This spring catches the otherwise engaged teeth and serves perfectly to assist the nut as before in holding the tension, but with its own softer tension as the criterion of the tension of the whole arch.

Having thus fully described my invention, I claim:—

1. An orthodontic arch wire comprising an arcuate wire member terminating in a sleeve having a plurality of teeth upon the extremity thereof, a second wire terminating at one extremity in a threaded portion adapted to slidably fit into the sleeve of said first wire, and a lock nut mounted upon the threaded portion of said second wire provided with a plurality of teeth upon one extremity adapted to engage the teeth of said sleeve to prevent return of said nut when once turned forward.

2. An orthodontic appliance arch including in combination, a pair of opposed members, a hollow extremity upon one of said members provided with rigid engagement means upon the hollow end thereof, a threaded portion upon the other member adapted to slide into said hollow extremity of said first member, and a rotary member mounted upon said threaded portion having an end projection thereon for directly engaging said engagement means upon said hollow extremity whereby to determine the relative projection of said threaded portion into said hollow end.

In testimony whereof, I have signed my name to this specification.

JOHN A. LINDE.